J. A. BURKE.
WHEELED RAKE.
APPLICATION FILED SEPT. 19, 1919.
1,331,317.
Patented Feb. 17, 1920.
2 SHEETS—SHEET 1.
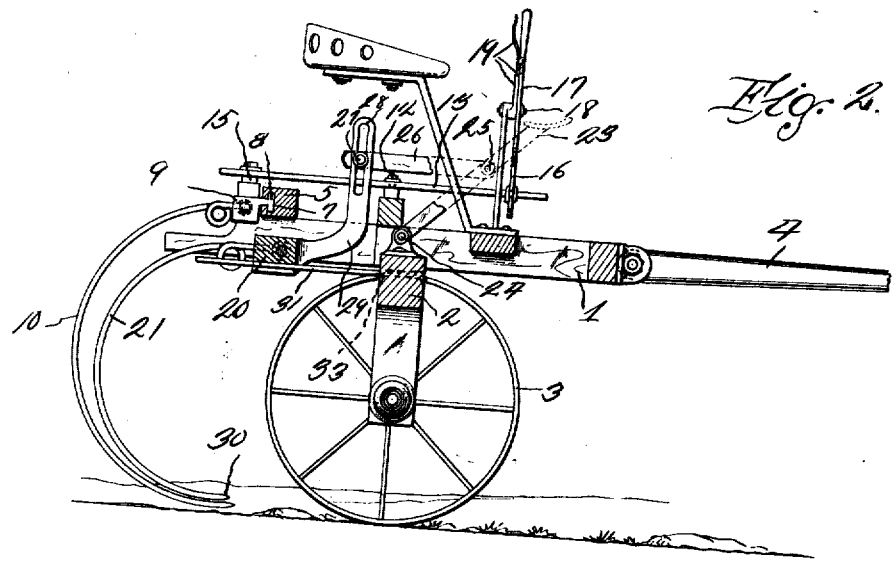
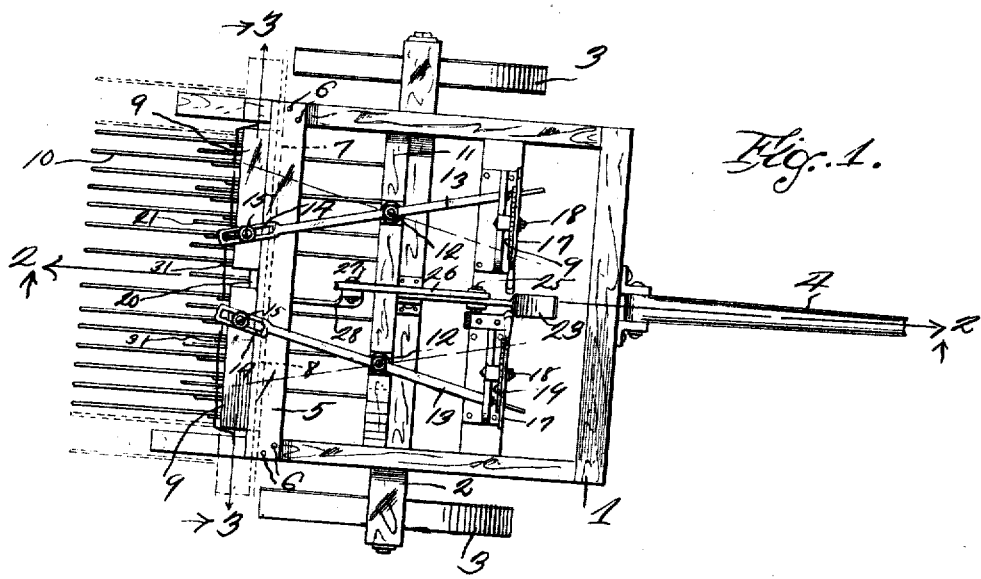
J. A. Burke, Inventor J. A. BURKE.
WHEELED RAKE.
APPLICATION FILED SEPT. 19, 1919.
1,331,317.
Patented Feb. 17, 1920.
2 SHEETS—SHEET 2.
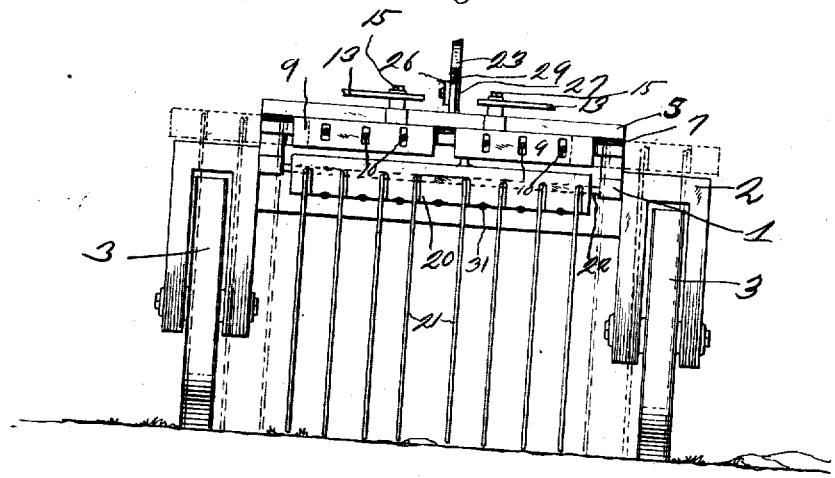
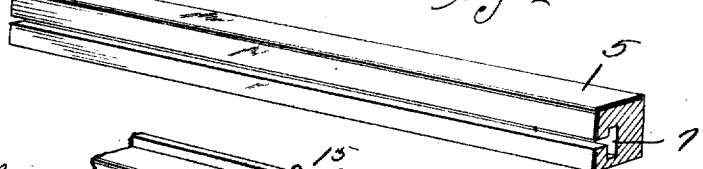
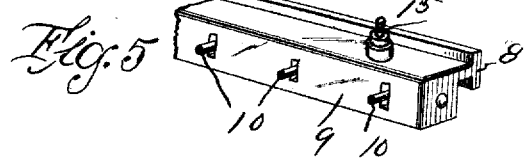
J. A. Burke, Inventor
By D. Swift, Attorney

UNITED STATES PATENT OFFICE.

JESSE ALFRED BURKE, OF GLASGOW, KENTUCKY.

WHEELED RAKE.

1,331,317.  Specification of Letters Patent.  Patented Feb. 17, 1920.

Application filed September 19, 1919. Serial No. 324,880.

*To all whom it may concern:*

Be it known that I, JESSE ALFRED BURKE, a citizen of the United States, residing at Glasgow, in the county of Barren, State of Kentucky, have invented a new and useful Wheeled Rake; and I do hereby declare the following to be a full, clear, and exact description of the invention, such as will enable others skilled in the art to which it appertains to make and use the same.

The invention relates to wheeled rakes and has for its object to provide a rake of this character wherein the toothed bar thereof may be adjusted inwardly or outwardly thereby allowing the raking of a wide area, also allowing the toothed bars to be adjusted inwardly so that their total width will be less than the width of the wheeled rake frame, thereby allowing the rake as a whole to pass through a narrow gate. This is not the case with wheeled rakes as at present constructed, wherein the toothed bars extend outwardly beyond the wheels, thereby making the rake too wide to pass through a narrow farm gate.

A further object is to provide a wheeled rake having a pair of transversely alined toothed bars slidably mounted in guides carried by the frame and to provide means whereby said toothed bars may be easily and quickly adjusted outwardly, also to provide a toothed bar centrally of the frame so that the space between the inner adjacent ends of the slidable bars will be covered by a raking element.

With the above and other objects in view the invention comprises further features and combination of parts as hereinafter set forth, shown in the drawings, described and claimed, it being understood that changes in the precise embodiment of the invention may be made within the scope of what is claimed without departing from the spirit of the invention.

In the drawings:—

Figure 1 is a plan view of the rake.

Fig. 2 is a longitudinal sectional view taken on line 2—2 of Fig. 1.

Fig. 3 is a transverse sectional view taken on line 3—3 of Fig. 1.

Fig. 4 is a perspective view of the guide bar for the slidable toothed bars.

Fig. 5 is a perspective view of one of the slidable toothed bars.

Referring to the drawings, the numeral 1 designates a rectangular frame and 2 a bolster to which said frame 1 is secured. Said bolster having rotatably mounted thereon conventional form wheels 3, for supporting the frame spaced from the ground when said rake as a whole is moved forwardly by draft animals which may be connected in any suitable manner to tongue 4. Extending transversely of the frame 1 at the rear end thereof is a guide bar 5, the ends of which are secured to the side rails of the frame as at 6. Guide bar 5 is provided with a transversely disposed T-shaped slot 7, in which T-shaped slot, T-shaped members 8 of the slidable toothed bars 9 are adapted to slide transversely. Toothed bars 9 have secured thereto series of spring teeth 10, which spring teeth extend rearwardly and curve forwardly and form means for raking hay and the like.

Extending transversely of the frame 1 and substantially above the axle is a bar 11, said bar having pivoted thereto as at 12, levers 13, the rear end of said levers being provided with elongated slots 14, which receive studs 15 carried by the slidable toothed bars 9. The forward ends of the levers 13 extend through slots 16 in vertically disposed levers 17, said levers being pivoted to brackets carried by the frame as at 18 and may be adjusted to various positions and held in said positions by means of a pawl and rack 19. It will be seen that by moving the forward ends of the levers 13, outwardly that the toothed bars 9 will be moved inwardly toward each other thereby allowing the raking of a smaller area or allowing the rake as a whole to easily pass through a gate. However, when it is desired to rake a wide area the levers are moved toward each other at their forward end, which movement will cause the toothed bar to move outwardly and by means of the pawls and racks 19 they may be maintained in any position to which they have been adjusted. It will be noted that as the inner adjacent ends of the toothed bars 9 move outwardly away from each other that a space would be left between said ends. To cover this particular space and prevent the leaving of a portion of the ground unraked, an auxiliary toothed bar 20 is provided; this bar is disposed under the slidable bars 9 and is provided with rearwardly, downwardly and forwardly extending teeth 21. Toothed bar 20 is rockably mounted on a transversely disposed rod 22 which passes longitudinally through the same and has its ends secured in any suitable manner in the side rails of the frame 1. The bar is pivotally mounted so that the teeth 10 and 21 may be adjusted relative to each other during the raking operation by means of the lever 23, which is pivoted as at 24 to the bolster 2 of the frame. Lever 23 has pivoted thereto as at 25, one end of a connecting rod 26, the other end of said rod being pivotally secured as at 27 in an elongated slot 28 of an arm 29 carried by the rockable toothed bar 20. It will be seen that as the lever 23 is forced downwardly at its upper end that the connecting bar 26 will cause the arm 29 to move forwardly thereby rocking the toothed bar 20 in such a manner as to bring the lower ends 30 of the spring teeth 21 upwardly, thereby adjusting the ends of the teeth in relation to the ends of the teeth 10. Rockable toothed bar 20 is returned to normal position by means of spring arms 31, which engage the under face thereof and are adapted to be sprung downwardly by the corners of the bar 20. Spring arms 31 are secured in the bolster 2 as at 33.

From the above it will be seen that a wheeled rake is provided which may be adjusted inwardly and outwardly so that said rake will easily pass through an ordinary gate, and also one wherein the width of raking surface may be adjusted to the needs and wants of the operator.

The invention having been set forth what is claimed as new and useful is:—

1. A rake comprising a frame, said frame being supported on wheels, the rear end of the frame being provided with a transversely disposed guide bar, said guide bar being provided with a T-shaped slot, slidable toothed bars having T-shaped flanges slidably mounted in said T-shaped slot of the guide bar, levers pivoted on the frame and having their rear ends slidably connected to the slidable toothed bars, whereby said bars may be adjusted outwardly or inwardly as desired, means whereby the forward ends of the levers may be maintained in different adjusted positions, and a second toothed bar disposed below the slidable toothed bars and adapted to rake the ground between the adjacent edges of the slidable toothed bars when said slidable toothed bars have been adjusted outwardly.

2. A rake comprising a frame, said frame being supported on wheels, the rear end of the frame being provided with a transversely disposed guide bar, said guide bar being provided with a T-shaped slot, slidable toothed bars having T-shaped flanges, slidably mounted in said T-shaped slot of the guide bar, levers pivoted on the frame and having their rear ends slidably connected to the slidable toothed bars, whereby said bars may be adjusted outwardly or inwardly as desired, means whereby the forward ends of the levers may be maintained in different adjusted positions, a second toothed bar disposed below the slidable toothed bars and adapted to rake the ground between the adjacent ends of the slidable toothed bars when said slidable toothed bars have been adjusted outwardly, said second toothed bar being rockably mounted thereby allowing the adjustment of its teeth into transverse alinement with the teeth of the slidable toothed bars, lever means whereby said rockable toothed bar may be rocked as desired and springs carried by the bolster of the frame and engaging under the lower face of the rockable toothed bar for returning said rockable toothed bar to normal position when its lever controlled means is released.

In testimony whereof I have signed my name to this specification in the presence of two subscribing witnesses.

JESSE ALFRED BURKE.

Witnesses:
B. G. ELLIS,
MORRIS BOTTS.